United States Patent [19]
Griswold et al.

[11] Patent Number: 5,362,132
[45] Date of Patent: Nov. 8, 1994

[54] VEHICLE SEAT ASSEMBLY WITH STRUCTURAL SEAT BACK TO ACCOMMODATE SEAT BELT LOADS APPLIED TO SEAT BACK

[75] Inventors: Les Griswold, Ann Arbor; Mark D. Hewko, Greenwood Canton, both of Mich.; John Krieger, Dublin, Ohio; Robert D. Elton, Ann Arbor, Mich.

[73] Assignee: Hoover Universal, Inc., Plymouth, Mich.

[21] Appl. No.: 659,500

[22] Filed: Feb. 22, 1991

[51] Int. Cl.⁵ .......................... B60N 2/12; A62B 35/00
[52] U.S. Cl. .................................. 297/483; 297/452.2; 297/362.14; 297/344.1; 297/284.1
[58] Field of Search .................. 297/216, 285 C, 344, 297/473, 475, 345, 452, 460, 346, 130, 338, 362.14, 483, 452.2, 362.11, 344.1, 284.1

[56] References Cited

U.S. PATENT DOCUMENTS

| | | | |
|---|---|---|---|
| 4,192,545 | 3/1980 | Higuchi et al. | 297/483 |
| 4,804,226 | 2/1989 | Schmale | 297/216 |
| 4,822,094 | 4/1989 | Oldfather et al. | 297/345 |
| 4,887,864 | 12/1989 | Ashton | 297/232 |
| 5,000,283 | 3/1991 | Kreig | 297/379 |
| 5,005,894 | 4/1991 | Nagota | 297/345 |
| 5,011,109 | 4/1991 | Nagota | 297/345 |
| 5,014,958 | 5/1991 | Harney | 297/346 |
| 5,022,677 | 6/1991 | Barbiero | 297/483 |
| 5,123,673 | 6/1992 | Tome | 297/468 |

Primary Examiner—Kenneth J. Dorner
Assistant Examiner—Cassandra Davis
Attorney, Agent, or Firm—Harness, Dickey & Pierce

[57] ABSTRACT

A vehicle seat assembly with a structural seat back to accommodate the seat belt loads applied to the seat back by the belt system which is carried by the seat assembly. The seat back includes a reinforced beam along one side of the seat back frame to accommodate these loads with a recliner mechanism along the same side of the seat assembly and engaging the reinforced member to resist forward rotation of the seat back caused by seat belt loads applied thereto. The seat assembly while being reinforced to accommodate the seat belt loads is configured to be as similar to conventional seat assemblies as possible to minimize the need to redesign the non-structural components of the seat assembly. In addition, the seat assembly includes many features found in current production seat assemblies such as a fore and aft adjuster, an adjustable lumbar support, a seat cushion lift and a seat back recliner. While reinforcing the seat structure, care has been taken to efficiently manage the seat belt loads without adding unnecessary structure and weight to the seat assembly.

15 Claims, 4 Drawing Sheets

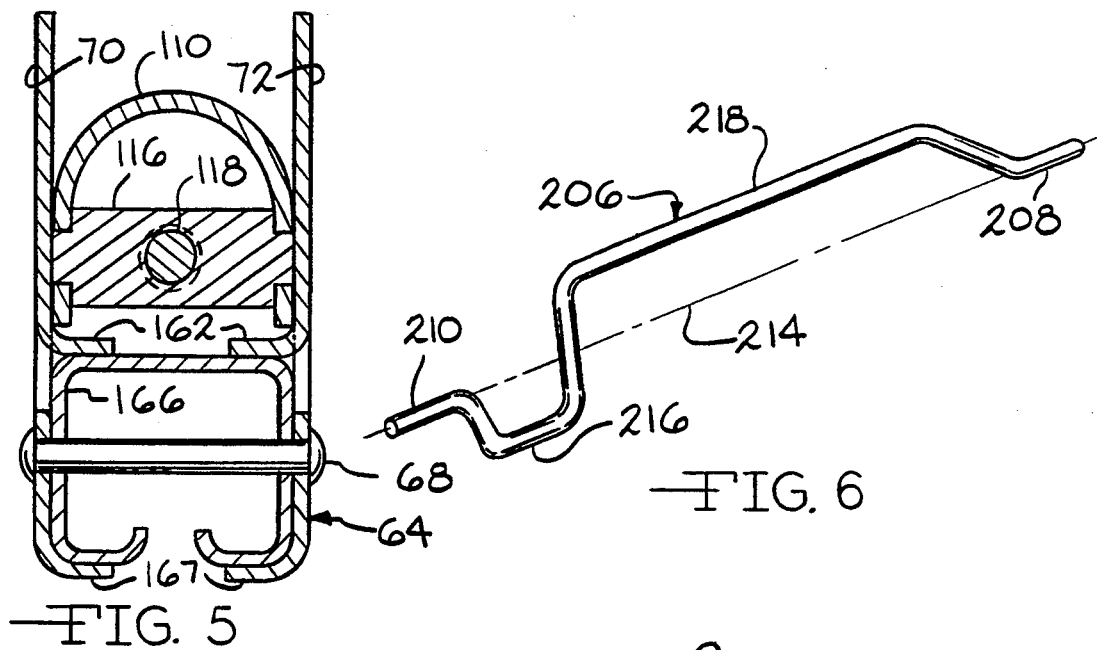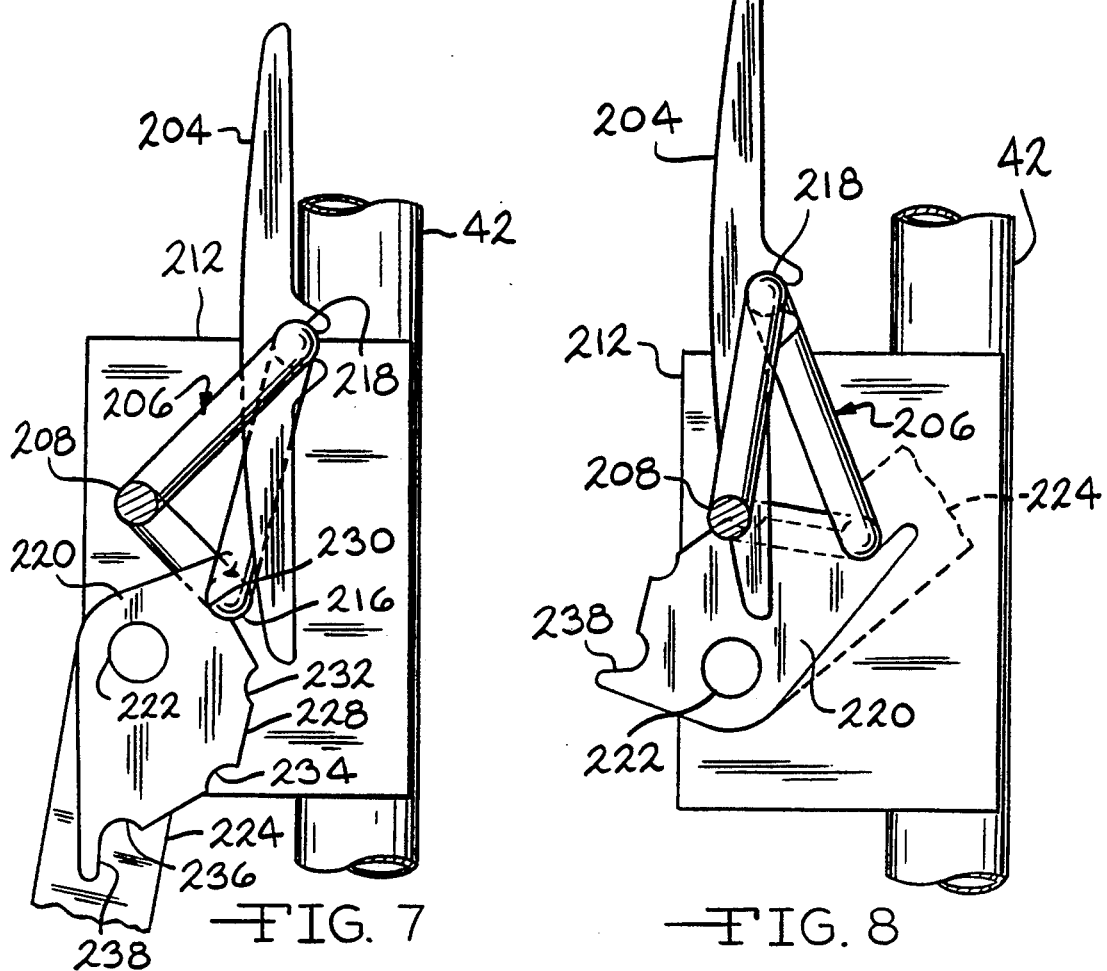

VEHICLE SEAT ASSEMBLY WITH STRUCTURAL SEAT BACK TO ACCOMMODATE SEAT BELT LOADS APPLIED TO SEAT BACK

BACKGROUND AND SUMMARY OF THE INVENTION

The present invention relates to a vehicle seat assembly and in particular to a seat assembly that also carries a seat belt system and is configured to withstand the high seat belt loads incurred during a vehicle collision.

Vehicle seat belt systems are typically mounted directly to the vehicle structure. For example, most belt systems have the belt retractor mounted to the vehicle floor pan with the belt webbing extending upwardly along the B-pillar of the vehicle to a D-ring mounted to the pillar. The webbing then extends downward to a belt end connected to the vehicle floor adjacent to the retractor. A clasp is slidably movable between the end of the seat belt anchored to the vehicle floor and the D-ring on the B-pillar. A buckle is attached to the vehicle floor on the opposite side of the seat. When the clasp is pulled across the user and inserted into the buckle, the webbing forms a lap belt and a shoulder belt to retain the occupant in the seat assembly.

The position of the vehicle seat assembly in the vehicle is adjustable in at least the fore and aft direction. With adjustment, the seat assembly is moved relative to the seat belt attachment points such that it can become inconvenient and uncomfortable for a seat occupant to use the seat belt. For example, if the vehicle seat is moved to its forwardmost position, it may be difficult to reach back to grasp the seat belt clasp along the B-pillar. In addition, with the seat moved forward, the shoulder belt may rub across the occupant's neck creating a discomfort. If the seat is adjusted to its rearwardmost position, the shoulder belt may be located too far forward relative to the occupant such that the person's torso can move forward some distance unrestrained by the shoulder belt.

Accordingly, it is an object of the present invention to provide a three point seat belt system comprising a lap belt and a shoulder belt that is mounted to and carried by the seat assembly itself so that regardless of the position of the seat assembly in the vehicle, the belt system remains in a constant position relative to the seat assembly and seat occupant.

It is another object of the invention, of course, to provide a seat assembly capable of withstanding the seat belt loads incurred during a vehicle collision.

It is also an object of the invention to provide a seat assembly that is as structurally similar to current production seat assemblies to minimize nonstructural changes to the seat assembly.

It is a further object of the invention to include in the seat assembly of this invention features commonly found in seat assemblies such as a seat back recliner, a fore and aft seat adjuster, an adjustable lumbar support mechanism and a vertical lift mechanism to raise the seat cushion.

The seat assembly of the present invention includes a pair of fore and aft extending fixed rails disposed along the lateral sides of the seat assembly with each rail having a track portion adapted to engage with the track portion of a pair of slide rails mounted on each fixed rail. The slide rails include the previously mentioned track portion as well as a riser portion extending upwardly from the track portion. The seat cushion pan is coupled to the slide rails through a four bar linkage mechanism used to raise and lower the seat cushion.

The seat back frame is pivotally mounted to the slide rails and extends generally upwardly from the rear of the seat cushion in a conventional manner. The seat belt system includes a belt retractor attached to an upper slide rail along one side of the seat assembly near the rear of the seat assembly. The belt extends from the retractor upwardly through the seat back to the top of the seat back where the belt projects forwardly from the seat cushion and extends downwardly along the same side where the belt end is attached to the slide rail. A buckle assembly is attached to the slide rail on the opposite side of the seat assembly and a clasp is slidably carried by the belt webbing between the belt end and the upper end of the seat back. When the clasp is pulled over the user's body and inserted into the buckle, the belt webbing is drawn out of the retractor forming a shoulder strap and a lap belt.

To accommodate the seat belt loads applied to the seat back. The back frame is formed with a beam extending generally upwardly along the side of the seat back to which the belt retractor and belt end are attached. The beam has a tapered closed-section that compensates for the increasing moment along its length to provide uniform material stress. The beam is of a hollow structure which tapers in an upwardly direction so as to reduce the quantity of material used in the beam at the upper end where the moment carried by the beam is reduced.

The overall seat back e structure is a quadrilateral with the upright beam forming one side of the quadrilateral. An upright member on the opposite seat side as well as upper and lower cross members are formed of a hollow tube, flattened in portions, and of significantly lesser structural capability than the upright beam. For lateral stability a diagonal brace (truss) extends from the upper end of the upright beam to the lower end of the opposite vertical frame member. The diagonal beam also has a flattened tubular structure.

The seat recliner mechanism is a single sided recliner on the same side of the seat as the seat belt assembly and is used to resist forward rotation of the seat back caused by seat belt loads applied to the seat back.

A mechanical adjustable lumbar support mechanism is provided in the seat back and includes a support paddle carried by a single piece bent wire to move the paddle in and out relative to the seat cushion.

Further objects, features and advantages of the invention will become apparent from a consideration of the following description and the appended claims when taken in connection with the accompanying drawings.

BRIEF DESCRIPTION OF THE DRAWINGS

FIG. 5 is a sectional view as seen from substantially the line 5—5 of FIG. 3;

FIG. 6 is a perspective view of the bent wire carrying the lumbar support paddle; and FIGS. 7 and 8 are side views of the lumbar support showing two adjusted positions of the lumbar support paddle.

DETAILED DESCRIPTION OF THE INVENTION

Figure 1:
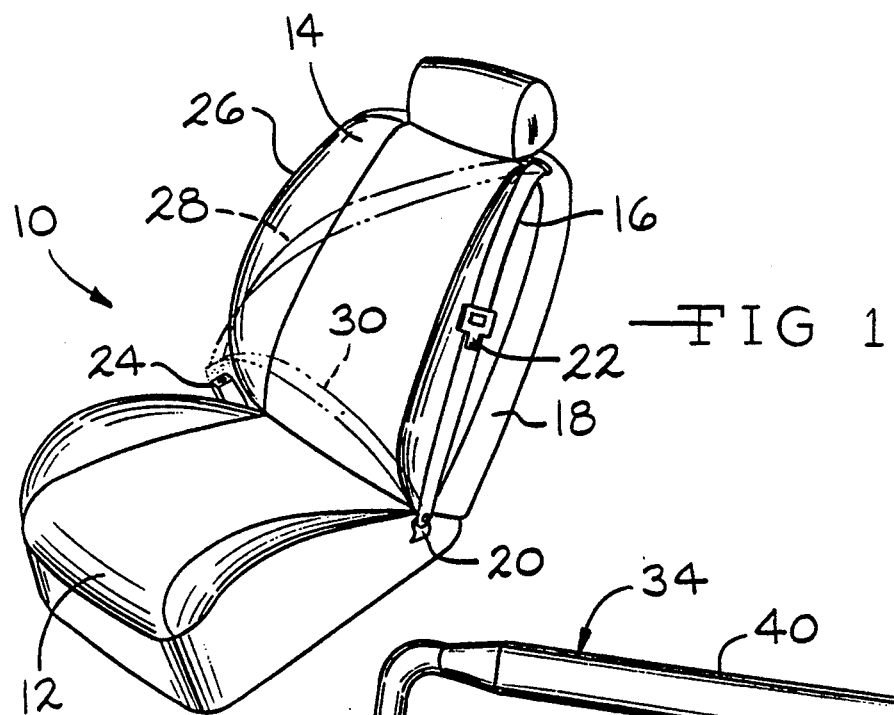
FIG. 1 is a perspective view of the seat assembly of the present invention.

The seat assembly of the present invention is shown in FIG. 1 and designated generally at 10. Seat assembly 10 includes a seat cushion 12 and a seat back 14 extending generally upwardly at the rear of the seat cushion. A seat belt webbing 16 extends outwardly from the top front of the seat back along the outboard side 18 of the seat assembly. The webbing 16 extends downwardly along the outboard side where one end of the seat belt webbing is attached to the seat assembly at 20. Clasp 22 is slidable along the seat belt webbing between the attachment 20 and the seat back upper end. A buckle mechanism 24 is attached to the inboard side 26 of the seat assembly for reception of the clasp 22 therein. When the clasp 22 is inserted into the buckle, the webbing 16 forms a shoulder belt 28 and a lap belt 30 shown in phantom.

The terminology "inboard" and "outboard" is used as a convenience to designate the sides of the seat assembly. As is typically the case, the shoulder belt extends from the upper outboard side of the seat assembly 20 to the lower inboard side of the seat assembly. The seat assembly of the present invention has been shown and described in this manner. However, nothing herein should be construed so as to limit the seat assembly of the present invention to such a belt configuration.

The seat back frame 34 includes a hollow main beam 36 along the outboard side of the seat and a bent tube 38 forming an upper cross member 40 an inboard vertical member 42 and a lower cross member 44. The bent tube 38 and upright beam 36 form a quadrilateral shape frame. A diagonal brace 46 extends from the upper end of the upright beam 36 to the lower end of the inboard vertical member 42. The bottom of beam 36 forms two parallel mounting flanges 48 defining a pivot axis 50 for the seat back. A mounting flange 52 extends downwardly from the end of the inboard vertical member 42 forming a mount on the inboard side of the seat back.

The upper end of the beam 36 includes a bracket 54 to support the belt webbing 16 which extends upwardly behind the beam 36, over the bracket 54 and then downward along the front of the seat back. During a vehicle collision, the load applied to the seat back by the shoulder belt 28 will produce a compressive load in the diagonal brace 46, a tensile load in the lower cross member 44, and a compressive load and forward bending moment in the upright beam 36. In addition to accommodating seat belt loads, the diagonal brace 46 will also resist side impact loading.

Figure 3:
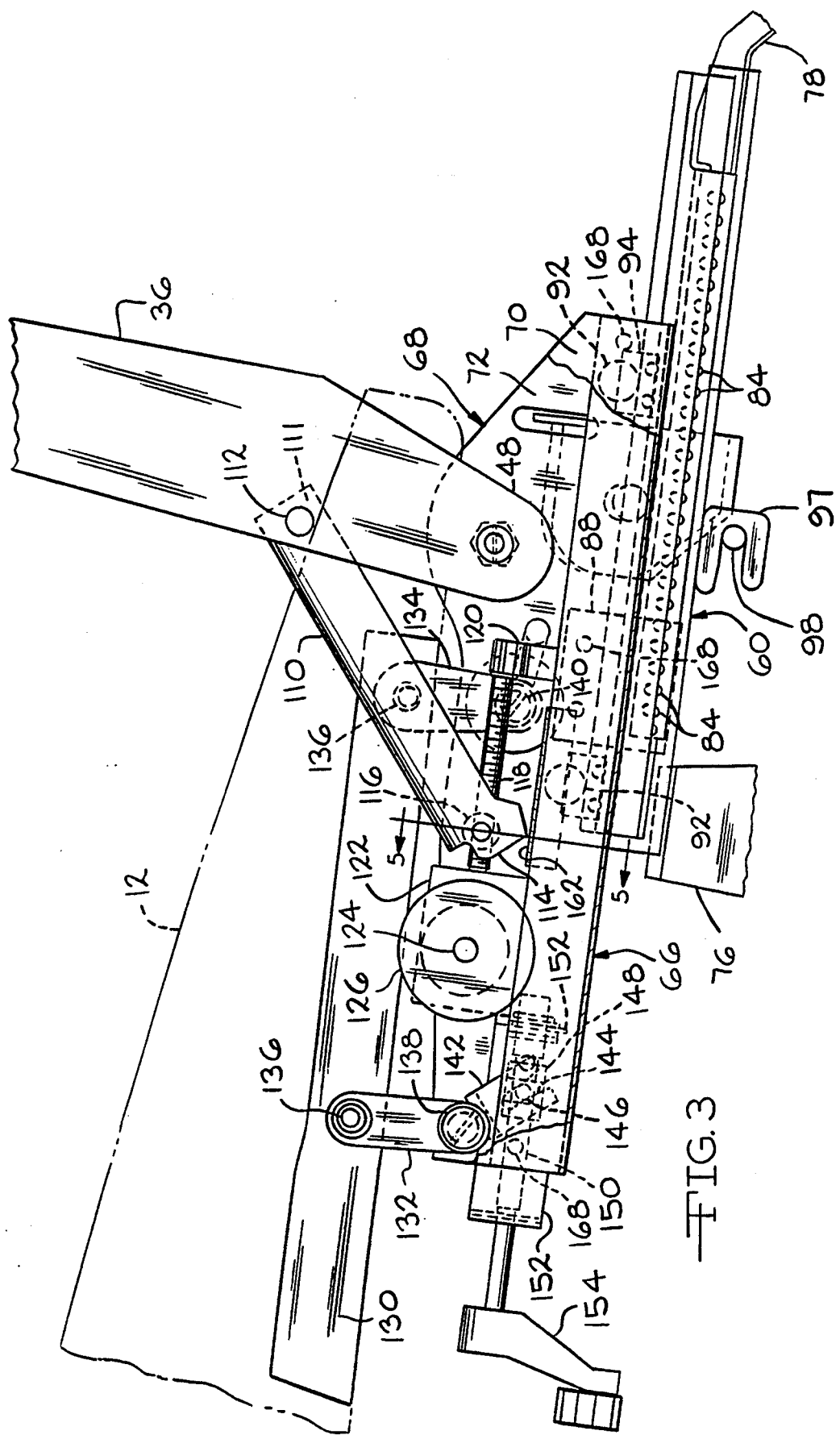
FIG. 3 is a side view of the seat assembly frame and track structure.
Figure 4:
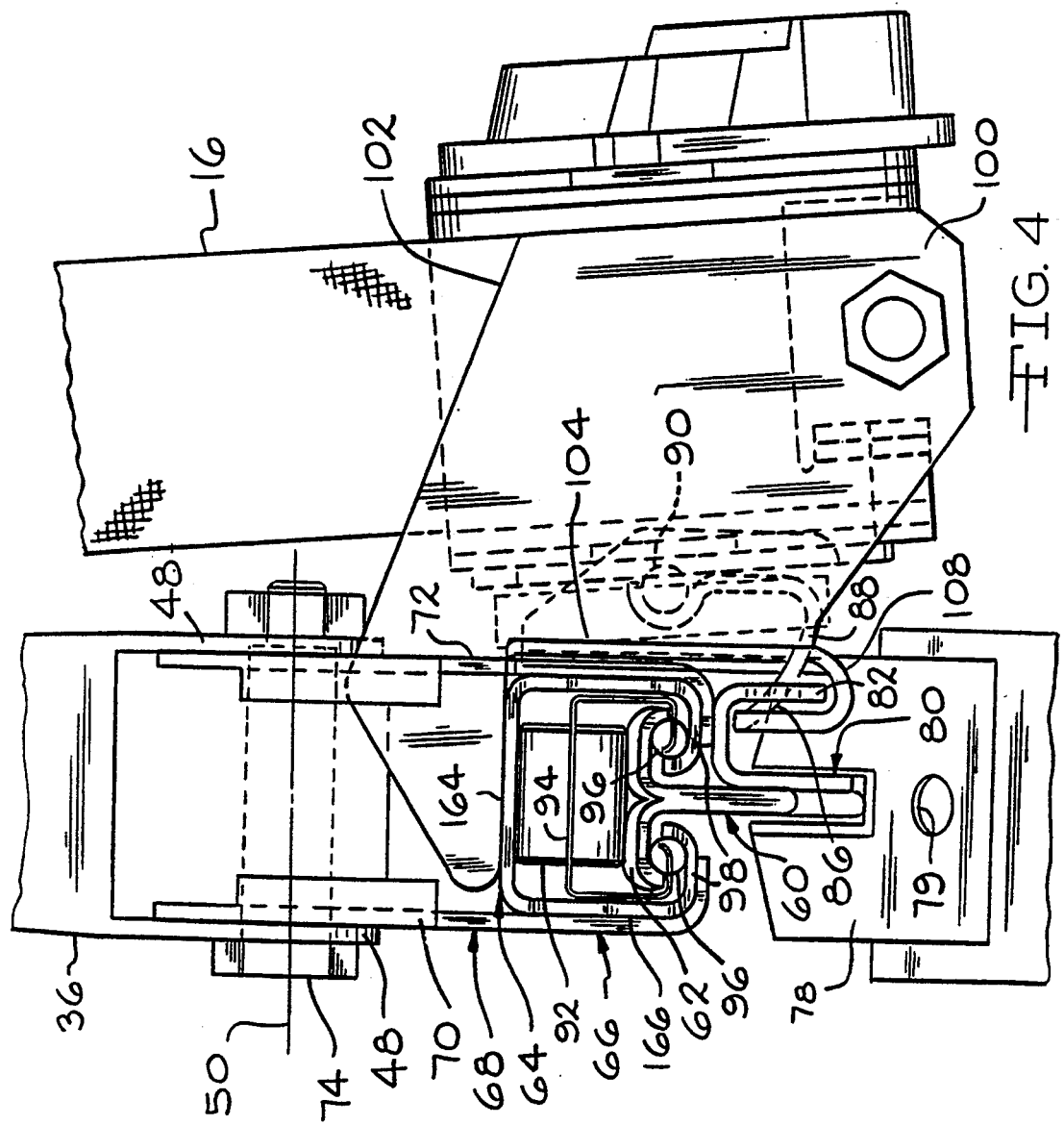
FIG. 4 is an end view of the seat frame structure of FIG. 3.

With reference to FIGS. 3, 4 and 5, seat assembly 10 includes a pair of fixed rails 60 with one rail disposed along the outboard side and the other rail disposed along the inboard side of the seat assembly. The outboard side of the seat assembly is shown to describe the invention. Fixed rail 60 is generally T-shaped in cross section with the upper cross bar of the "T" forming a track portion 62. The track portion 62 engages with the C-shaped slide track portion 64 of the slide rail assembly 66. The seat assembly includes a pair of slide rail assemblies 66 with one mounted to each of the fixed rails 60. Slide rail assembly 66, in addition to the slide track portion 64 includes a riser portion 68 which extends upwardly from the slide track portion 64 in the form of two spaced plates 70 and 72. The mounting flanges 48 and 52 of the seat back frame are pivotally connected to the riser portion 68 of the two slide rails at seat back pivot 74.

An inverted U-shaped latch bracket 80 is mounted to the fixed rail 60 along the inboard side of the rail and below the fixed track portion 62. The inward leg 82 of latch bracket 80 includes a plurality of perforations 84 through which the teeth 86 of latch 88 are inserted. The latch 88 is pivotally carried by the slide rail assembly 66 for rotation about pivot 90. A conventional latch release mechanism (not shown) is coupled with the latch 88 to withdraw the teeth 86 from the perforations 84 to enable the slide rail assembly 66 to move fore and aft relative to the fixed rail 60 whereby the fore and aft position of the seat is adjusted.

The slide rail assembly 66 is supported upon the fixed rail 60 by a pair of rollers 92 disposed within the C-shaped cross section of the slide track portion 64 and held in place by race 94. A plurality of roller balls 96 are placed between the inwardly turned flanges 98 of the slide track portion 64 and the fixed track portion 62 of the fixed rail for ease of sliding movement of the slide rail assembly relative to the fixed rail.

A seat belt retractor 100 is attached to the slide rail assembly 66 by bracket 102. Bracket 102 has a mounting flange portion 104 through which the bracket is fastened to the slide rail assembly by bolts or rivets (not shown). Flange 104 also includes a J-hook portion 108 which extends upwardly into the interior of the U-shaped latch bracket 80 fixed attached to the fixed rail 60. Belt webbing 16 extends upwardly from the retractor 100 to the top of upright beam 36.

The seat assembly is supported by the vehicle floor at three locations along each side. The front end of the fixed rail 60 rests on a support pedestal 76. The rearward end of the fixed rail 60 terminates in a mounting flange 78 having an aperture 79 therethrough for suitable bolt or other fastener A mounting hook 97 is coupled to the fixed rail between the front and rear ends of the fixed rail for engagement with a floor pin 98. Hook 97 serves to reduce the length of the moment arm of the fixed rail when seat belt applies upward loads on the fixed rail.

The recliner mechanism includes a support brace 110 having one end 111 pivotally connected to the seat back upright beam 36 at pivot 112. Pivot 112 is spaced above the seat back rotational pivot 74 so that rearward movement of the brace 110 causes the seat back to rotate rearward about pivot 74. The opposite end 114 of the brace is pivotally coupled to a drive nut 116 which is in turn threadably connected to a lead screw 118. The lead screw 118 extends fore and aft between the two riser plates 70 and 72.

Lead screw 118 is coupled to the slide rail assembly 66 by bearing support 120 and right angle drive assembly 122. The drive assembly 122 contains a pair of 45° bevel gears coupling the lead screw 118 to a drive shaft 124 extending outwardly through riser plate 70. A hand knob 126, accessible along the outboard side of the seat assembly, is rotated by a seat occupant to rotate lead screw 118. Rotation of the lead screw in turn causes the drive nut 116 to travel fore and aft along the length of the lead screw. In so doing, the end 114 of the support brace 110 is moved fore and aft causing the brace end 111 to move. However, due to the pivotal coupling 112 of support brace 110 to the seat back the end 111 travels in an arcuate path about the pivot 74 rotating the seat back to various inclined positions.

The seat cushion 12 is carried by a seat pan 130 which is in turn coupled to the slide rail assembly 66 by a four bar lift mechanism. The lift mechanism includes a pair of lift levers on each side of the seat assembly carrying the seat pan 130 at four points. Fore and aft lift levers 132 and 134 are pivotally coupled to the seat pan 130 about at their respective pivots 136. The lower ends of the lift levers are rigidly coupled to a fore and aft pivot shafts 138 and 140 respectively. Pivot shafts 138 and 140 extend laterally across the seat assembly from the outboard slide rail assembly to the inboard slide rail assembly. As the pivot shafts 138 and 140 are rotated, the lift levers 132 and 134 operate to raise or lower the seat pan and cushion between a lowered rearward position to a raised forward position. The amount of lift relative to fore and aft travel of the seat cushion depends on the lengths of the lift levers as well as their angular position. Furthermore, the amount of lift at the front of the seat can be equal or unequal to the amount of lift at the rear depending on the length and angular position of the lift levers.

The aft lift levers 134 are wider at the pivot 136 where they are attached to the seat cushion pan 130 than they are at pivot shaft 140. This increased width reinforces the pan 30 at the lift lever attachment.

The forward pivot shaft 138 is rotated by a drive lever 142 also rigidly attached to the forward pivot shaft 138. Drive lever 142 contains a radially extending slot 144 in which a pin 146 from drive nut 148 is inserted. Drive nut 148 is threadably coupled to a lead screw 150 for fore and aft movement upon rotation of the lead screw. Lead screw 150 is attached to one of the slide rail assemblies by bearing supports 152. A crank 154 accessible from the front of the cushion 12 is used to rotate lead screw 150. As the drive nut 148 is moved along the length of the lead screw, the pin 146 will travel through the slot 144, transferring the linear motion of the nut 148 into rotational motion of the drive lever 142, thus raising or lowering the cushion 12 depending upon the direction of rotation of lead screw 150. The aft pivot shaft and lift levers rotate in response to rotation of the fore pivot shaft.

The lead screw seat lifter provides a simple mechanism to adjust the seat cushion position and to hold the seat cushion in place. The slot 144 in levers 142 enables the linear motion of drive nut 148 to rotate the drive lever. By driving the fore pivot shaft the lead screw can be relative short rather than having to extend from the front of the cushion to the aft pivot shaft. If desired, the lead screw can be driven by an electric motor/transmission assembly instead of by crank 154.

Figure 2:
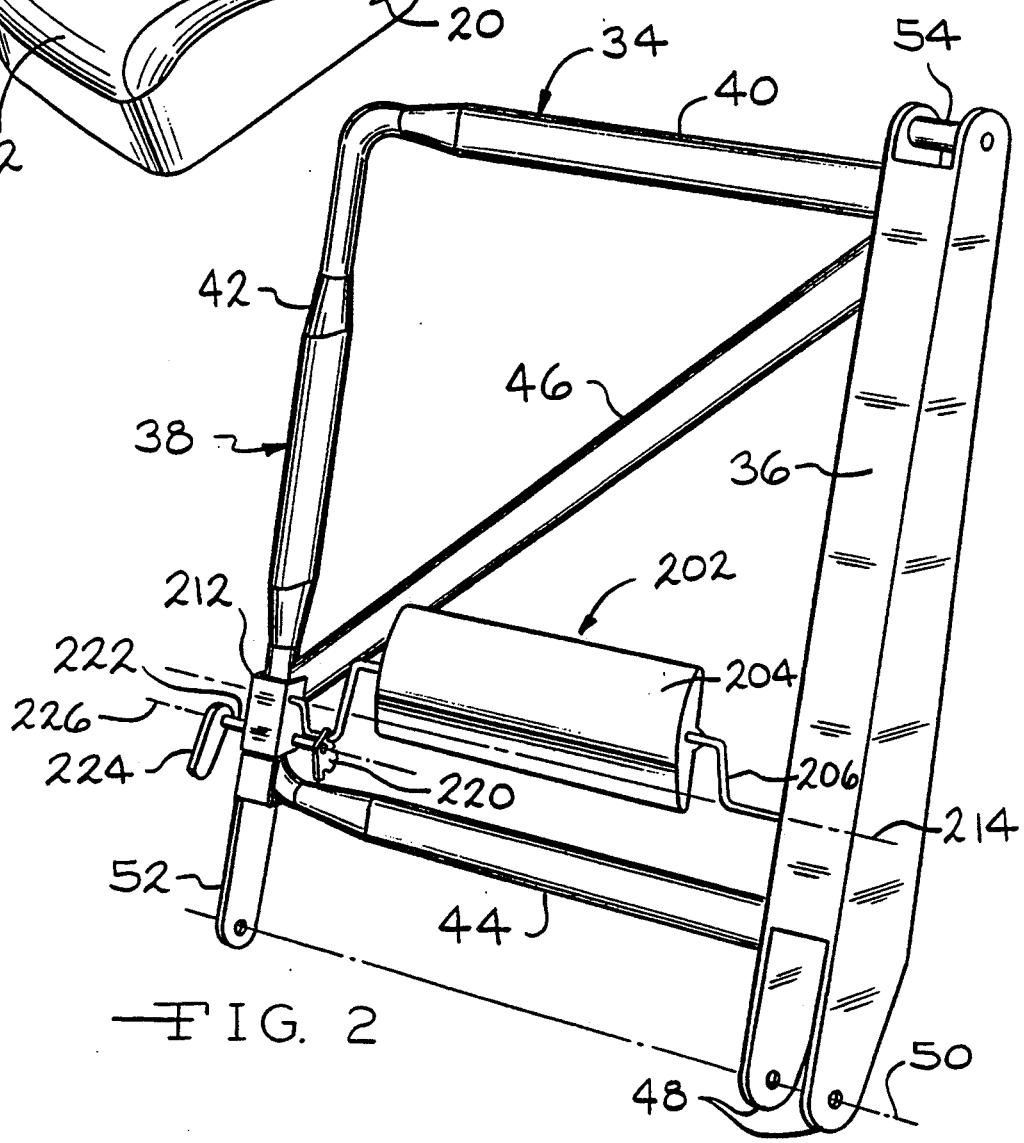
FIG. 2 is a perspective view of the seat back frame and lumbar support mechanism.

The seat assembly 10 also includes a mechanical lumbar support 202 shown in FIG. 2. Lumbar support 202 can be used to provide adjustable support to the lumbar region of the back of a seat occupant. Lumbar support 202 includes a support paddle 204 carried by a single piece bent wire 206 pivotally mounted to the seat back frame.

Bent wire 206, shown in greater detail in FIGS. 6–8, includes a pair of end portions 208 and 210 that are coupled to the hollow beam 36 and upright support 42 of the seat back frame respectively. One end portion is pivotally mounted on a bracket 212 secured to the seat back frame. The other end portion 208 pivots directly in the hollow beam 36. The end portions are aligned so that the wire can rotate about a generally horizontal axis 214 extending through the end portions and extending transversely of the seat back.

The wire is bent to form a follower portion 216 adjacent to end portion 210 which forms an offset crank for rotating the bent wire 206 as described below. The center of bent wire 206 forms a lumbar paddle attachment portion 218 to which the lumbar support paddle 204 is pivotally mounted.

A cam 220 is fixably secured to a shaft 222 which extends horizontally through one of the brackets 212 and is rotatably supported thereon. An actuating handle or lever 224 is secured to the opposite end of shaft 222 to enable manipulation of the handle to rotate the cam 220 about the pivot axis 226 corresponding to the axis of shaft 222. The cam 220 has a control side or surface 228 which is in continuous engagement with the follower portion 216 of the bent wire and is provided with a plurality of defined stop surface portions 230, 232, 234 and 236 which are located at progressively increasing distances from the pivot axis 226. Beyond the stop surfaces 230 and 236 the cam is provided with stop walls 238 to prevent excessive rotation of the cam and disengagement from the follower portion 216 of the bent wire.

Rotation of the handle 224 causes the bent wire to rotate about the axis 214 moving the support panel 204 in or out relative to the seat back to increase or decrease the support provided to the seat occupant lumbar region. The wire 206 is bent to form the follower portion as well as the two end portions to provide a simple mechanical lumbar support. Previous mechanical lumbar supports included a weldment structure to carry a radially spaced follower portion or include an extension welded to the wire to form the follower portion. Such structures are more complicated to manufacture, requiring multiple assembly operations and further have decreased reliability in that there is an opportunity for failure by separation of the welded components. These disadvantages are not present with the single bent wire structure which is formed of a single member not requiring any assembly operations.

Seat assembly 10, while providing many features found in a conventional seat assembly not equipped with a seat belt system, such as a recliner mechanism, a vertical lift mechanism adjustable lumbar support and a fore and aft seat adjustment mechanism, is in many respects structurally similar to a conventional seat assembly. However, many modifications have been made to the seat assembly to provide the necessary strength to accommodate the seat belt loads.

The recliner mechanism is the only structure which acts upon the seat back to resist forward rotation in response to seat belt loads applied thereto. The end 114 of support brace 110 is positioned between the two riser plates 70 and 72 to prevent lateral deflection or shifting of the support brace 110 when it is loaded in compression. The support brace is closely spaced from the slide track portion so that very little downward deflection of the support brace is needed before engagement with the slide track portion, lending additional support during a collision. At the point of contact between the support brace and slide track portion, the two riser plates form upturned tabs 162 overlying the slide track portion. These tabs serve to reinforce the slide track portion at the point of loading. The right angle drive assembly 122 sandwiched between the two riser plates 70 and 72 form a rigid structure to resist forward deflection of the support brace.

The riser plates themselves are specifically configured to assist in carrying seat belt loads. A typical riser plate is bolted or riveted directly to the top portion 164 of the C-shaped slide track portion 64. With such an arrangement, however, loads applied to the riser plates are carried directly through the attaching bolts or rivets. The riser plate 70 and 72 are instead configured generally with an L-shaped cross section extending downwardly along the sides 166 of the C-shaped slide track portions. The bottoms 167 of the L-shaped section are folded under the C-shaped slide track portion. A plurality of rivets 168 extend through the riser plates 70 and 72 and the C-shaped track portion 64. The rivets act to hold the slide rail assembly together and prevent lateral deformation or unfolding of the L-shaped riser plates, C-shaped slide track portion and the T-shaped fixed rail.

The J-hook portion 108 of the retractor mounting bracket 102 also provides additional support. The upward forces applied to the seat back bracket will cause the J-hook to engage the latch bracket 80 to resist further motion. The teeth 86 of latch 88 also extend upwardly toward the U-shaped latch bracket to resist deformation. In addition, the latch 88 is equipped with five teeth 86 for increased strength.

While providing additional structure and strength necessary to reduce impact loads, the seat assembly 10 has accomplished this by efficient management of material avoiding the use of excess material where not needed. One example of this is the tapered section of the upright beam 36 which decreases in section as the bending moment applied to the beam also decreases toward the upper end of the beam.

The seat assembly 10 thus accomplishes the objectives of the present invention of providing a seat assembly to which the seat belt system is carried to overcome the inconveniences of having a seat belt system coupled to the vehicle structure with the seat assembly being movable relative to the belt system. In accomplishing these objectives the seat assembly 10 has maintained many elements of a traditional seat structure and many features of a seat assembly while providing the necessary strength to accommodate the added loads applied to the seat assembly by the seat belt system.

It is to be understood that the invention is not limited to the exact construction or method illustrated and described above, but that various changes and modifications may be made without departing from the spirit and scope of the invention as defined in the following claims.

We claim:

1. A vehicle seat assembly having first and second laterally spaced sides comprising:

first and second fore and aft extending fixed rails with said first fixed rail being disposed along said first side of the seat assembly and said second fixed rail being disposed along said second side of the seat assembly, said fixed rails being adapted to be mounted to a vehicle and each having a first track portion;

first and second slide rails carried by said first and second fixed rails respectively, said slide rails each including a slide track portion slidable coupled with the fixed track portion of said fixed rails for movement fore and aft, and said slide rails each including a riser portion extending upwardly from said slide track portion;

a seat cushion having a rear end coupled to said slide rails and a back frame pivotally mounted to said slide rails and extending generally at the rear end of said seat cushion to an upper end;

recliner means disposed at said first side of said seat assembly for holding said back frame in an upright position relative to said slide rails and for selectively adjusting said upright position;

a seat belt system including seat belt retractor means mounted to said first side of said seat assembly, a seat belt having an end coupled to said retractor means and extending upwardly from said retractor means through a belt loop means at the upper end of said back frame along said first side, and down to said slide rail on said first side of said seat assembly, a clasp mounted on said seat belt, and a belt buckle attached to said second side rail on said second side of said seat assembly for reception of said clasp when said seat belt is extended over the shoulder and around the lap of a user of said seat assembly;

said recliner means including a single support brace disposed at said one side of said seat assembly having a first end pivotally coupled to said back frame above the pivotal mount of said back frame to said slide rail at said first side of said seat assembly, said support brace extending forwardly and downwardly to a second end;

a drive nut pivotally coupled to said support brace near said second end of said support brace; and an elongated lead screw mounted to said first slide rail and extending in a fore and aft direction, said drive nut being threadably coupled to said lead screw whereby said nut moves along said lead screw in response to rotation of said lead screw resulting in movement of said support brace second end fore and aft causing said back frame to rotate about the pivotal mount of said back frame to said slide rails.

2. The seat assembly of claim 1 further comprising right angle drive means for rotating said lead screw including a hand knob disposed along said first side of said seat assembly.

3. The seat assembly of claim 1 wherein said support brace second end is closely spaced above the slide track portion of said first slide rail whereby upon downward deflection of said support brace, said support brace engages said slide track portion of said first slide rail whereby loads applied to said back frame by said seat belt are partially transferred by said support brace to said first slide rail.

4. The seat assembly of claim 1 wherein said riser portion of said first slide rail includes a pair of fore and aft extending vertical plate members projecting upwardly from opposite lateral sides of said slide track portion to laterally surround said support brace second end whereby lateral deflection of said support brace second end is resisted.

5. The seat assembly of claim 4 wherein said plate members project downward along opposite sides of said slide track portion and are folded beneath said slide track portion and wherein said first slide rail further comprises fastening means for securing said plate members to the sides of said slide track portion to prevent lateral separation of said plate members from said slide track portion.

6. A frame for a vehicle seat back comprising a generally quadrilateral structure having spaced first and second generally upright pillars having upper and lower ends forming lateral sides of said frame, upper and lower generally horizontal cross members spanning between said upright pillars at the upper and lower ends of said upright pillars respectively and a diagonal brace extending from the upper end of said first pillar to the lower end of said second pillar, means for mounting a seat belt to said first pillar at the upper end thereof for extension of a seat belt from the upper end of said first pillar, said first pillar being reinforced as compared to said second pillar and said cross members to accommodate loads applied to said frame through said means for mounting a seat belt and said diagonal brace transferring loads applied to said first pillar at the upper end thereof to the lower end of said second pillar through both compression and tension in said diagonal brace.

7. The frame of claim 6 wherein said first pillar is a hollow beam which tapers in cross section from the lower end of said beam to the upper end of said beam.

8. A vehicle seat assembly having first and second spaced lateral sides comprising:

a base frame adapted to be mounted to a motor vehicle, said base frame being generally horizontal and spanning laterally between said first and second sides and having a rear end;

a generally horizontal seat cushion mounted to said base frame and spanning laterally between said first and second sides;

a seat back spanning laterally between said first and second sides, said seat back having a lower end adjacent said rear end of said base frame and extending upwardly therefrom to an upper end, said seat back having a back frame mounted to said base frame at said lower end of said seat back and extending upwardly to said upper end of said seat back, said seat back being mounted to said base frame for rotation about a lateral axis at said lower end of said seat back;

said back frame being generally quadrilateral in shape having a reinforced member extending upwardly at said first side from said lower end to said upper end of said seat back, an upright member extending upwardly at said second side from said lower end to said upper end of said seat back, upper and lower horizontal cross members extending between said reinforced member and said upright member and a diagonal brace extending from said reinforced member at said upper end to said upright member at said lower end, said diagonal brace transferring loads applied to said reinforced member at the upper end to said upright member at said lower end through both compression and tension of said diagonal brace; and a seat belt system having an elongated belt webbing having first and second ends, said first end being attached to one of said base frame and said back frame adjacent the rear end of said base frame and the lower end of said back frame at said first side, said webbing extending upwardly from said first end along said first side of said seat assembly to the upper end of said seat back over the reinforced member and downward to said second end attach to one of said base frame and said back frame below said upper end, said seat belt system further including a clasp mounted to said webbing between said first end of said webbing and the upper end of said seat back and a buckle attached to one of said base frame and said back frame adjacent the rear end of said base frame and the lower end of said back frame at said second side of said seat assembly whereby when said clasp is inserted into said buckle, said webbing forms a lap belt and a shoulder belt.

9. The seat assembly of claim 8 further comprising recliner means positioned along said first side of said seat assembly for holding said seat back in a selected position relative to said base frame, said recliner means being coupled to said reinforced member and said base frame.

10. The seat assembly of claim 8 wherein said reinforced member is a hollow beam.

11. The seat assembly of claim 10 wherein said hollow beam tapers in cross section upwardly.

12. The seat assembly of claim 8 wherein said base frame comprises a pair of fixed rails adapted to be coupled to a vehicle floor with one rail being disposed along said first side of said seat assembly and the other rail being disposed along said second side of said seat assembly, a pair of slide rails coupled to said fixed rails for fore and aft sliding motion with one slide rail being coupled to each of said fixed rails, said seat cushion and back frame being mounted to said slide rails, and said first end of said webbing and said buckle both being attached to said slide rails.

13. The seat assembly of claim 12 further comprising lift means for raising and lowering said seat cushion relative to said slide rails, said lift means comprising front and rear pivot shafts extending laterally between said slide rails, a pair of lift levers fixedly attached to each pivot shaft and pivotally attached to said seat cushion, a drive lever fixedly attached to said front pivot shaft and forming a radially extending slot therein, a drive nut threadably engaging a fore and aft extending lead screw for fore and aft motion upon rotation of the lead screw and pin means extending from said drive nut for sliding motion in said slot for rotating said drive lever as said nut is moved fore and aft.

14. The seat assembly of claim 8 wherein said base frame comprises first and second fixed rails adapted to be coupled to a vehicle floor with said first fixed rail being disposed along said first side of said seat assembly and said second fixed rail being disposed along said second side of said seat assembly, first and second slide rails coupled to said fixed rails respectively for fore and aft sliding motion, said seat cushion and back frame being mounted to said slide rails, and said first end of said webbing and said buckle both being attached to said slide rails; and said recliner means includes a lead screw extending fore and aft mounted to said first slide rail, a drive nut threadably coupled to said lead screw for fore and aft movement along said lead crew in response to rotation of said lead screw, and a support brace having a first end pivotally connected to said reinforced member at a location above said lateral axis, said support brace extending forwardly and downwardly from said first end to a second end coupled to said drive nut whereby said drive nut and said second end of said brace move fore and aft in response to rotation of said lead screw to adjust the reclined position of said seat back.

15. The seat assembly of claim 14 wherein said brace has an inverted U-shaped section with a pair of spaced legs surrounding said lead screw and said drive nut at the second end of said support brace, and said second end of said brace is closely space above a horizontal support surface of said first slide rail whereby forward loads applied by said seat belt to said reinforced member causing downward deflection of said support brace results in engagement of said support brace with said first slide rail to transfer the load directly from said support brace to said first slide rail without transferring said load through said drive nut and lead screw.

* * * * *

UNITED STATES PATENT AND TRADEMARK OFFICE
CERTIFICATE OF CORRECTION

PATENT NO. : 5,362,132
DATED : 11/8/94
INVENTOR(S) : Les Griswold, Mark D. Hewko, John Krieger, Robert D. Elton It is certified that error appears in the above-identified patent and that said Letters Patent is hereby corrected as shown below:

Column 9, Line 1, after "ends" insert --and--

Column 2, Line 32, after "back", delete "e" and insert --frame--

Column 4, Line 40, after "fastener" insert --.--

Signed and Sealed this

Twenty-second Day of August, 1995

Attest:

BRUCE LEHMAN

Attesting Officer     Commissioner of Patents and Trademarks